United States Patent
Wells et al.

(10) Patent No.: US 12,333,833 B1
(45) Date of Patent: Jun. 17, 2025

(54) CORRELATION OF SIGNALS

(71) Applicant: Jumio Corporation, Palo Alto, CA (US)

(72) Inventors: Stuart Wells, Saratoga, CA (US); Lukas Danzer-Stauffer, Maria Anzbach (AT); Thomas Krump, Buchkirken (AT); Anshuman Vikram Singh, Vienna (AT); Lukas Bayer, Vienna (AT)

(73) Assignee: Jumio Corporation, Sunnyvale, CA (US)

( * ) Notice: Subject to any disclaimer, the term of this patent is extended or adjusted under 35 U.S.C. 154(b) by 489 days.

(21) Appl. No.: 17/957,249

(22) Filed: Sep. 30, 2022

(51) Int. Cl.
*G06T 7/50* (2017.01)
*G06V 30/146* (2022.01)
*G06V 40/16* (2022.01)

(52) U.S. Cl.
CPC ............ *G06V 30/1473* (2022.01); *G06T 7/50* (2017.01); *G06V 40/172* (2022.01)

(58) Field of Classification Search
CPC ..... G06V 30/1473; G06V 40/172; G06T 7/50
See application file for complete search history.

(56) References Cited

U.S. PATENT DOCUMENTS

2015/0006132 A1* 1/2015 Matsumura ............ G08G 1/095
703/2

\* cited by examiner

*Primary Examiner* — Sam Bhattacharya
(74) *Attorney, Agent, or Firm* — Patent Law Works LLP (57) ABSTRACT

The disclosure includes a system and method for correlation of signals including determining, using one or more processors, a first position in a user journey; determining, using the one or more processors, a first set of signal data identified for capture at the first position in the user journey, the first set of environmental signal data including a representation, at a first time, of one or more of an environment of a user device and the user device in relation to the environment; obtaining, using the one or more processors, the first set of signal data, the first set of signal data including first sensor data obtained from a first sensor at the user device; and determining, using the one or more processors, based at least in part on the first set of signal data including the first sensor data, a correlation to untrustworthiness.

22 Claims, 5 Drawing Sheets

CORRELATION OF SIGNALS

BACKGROUND

The present disclosure relates to correlating signals to determine trustworthiness or untrustworthiness.

Inputs, such as inputs of documentation, may be provided for any number of reasons or in association with any number of transactions in a user journey. For example, providing picture ID may be required to open a financial account to reduce the risk of fraud and/or to comply with laws (e.g., anti-money laundering or sanctions). In another example, a copy of recent bank statement or utility bill with a street address may be provided to prove a place of residence, which may be relevant for obtaining a library card, registering for school in a school district, registering to vote in a district, etc. In yet another example, an image of a check may be provided to deposit the check.

SUMMARY

This specification relates to methods and systems for correlation of signals. According to one aspect of the subject matter described in this disclosure, a computer-implemented method of correlation of signals includes determining, using one or more processors, a first position in a user journey; determining, using the one or more processors, a first set of signal data identified for capture at the first position in the user journey, the first set of environmental signal data including a representation, at a first time, of one or more of an environment of a user device and the user device in relation to the environment; obtaining, using the one or more processors, the first set of signal data, the first set of signal data including first sensor data obtained from a first sensor at the user device; and determining, using the one or more processors, based at least in part on the first set of signal data including the first sensor data, a correlation to untrustworthiness.

Other implementations of one or more of these aspects include corresponding systems, apparatus, and computer programs, configured to perform the actions of the methods, encoded on computer storage devices.

These and other implementations may each optionally include one or more of the following features. For instance, the features include, based on determining that the first set of signal data correlates to untrustworthiness, taking an action, wherein the action includes one or more of rejecting a user request, subjecting the user request to an additional authentication, contacting an authority, initiating a case, and labeling the user request as untrustworthy.

For instance, the first sensor data includes a first image captured by a first camera, and determining the correlation to untrustworthiness comprises one or more of: determining peripheral image data, the peripheral image data representing a portion of the first image that was not presented to a user at a time of capture of the first image, wherein the first camera has a wider field of view than is presented to the user at the time of capture; and identifying one or more suspicious objects in the peripheral image data, wherein a suspicious object includes one or more of a mask and another version of a document. For instance, the first set of signal data includes the first sensor data obtained from the first sensor and second sensor data obtained by a second sensor, and wherein the first sensor data and second sensor data are obtained contemporaneously from two sensors at the user device. For instance, the first sensor data includes an image, the first sensor comprising a camera, the second sensor data comprises range data representing one or more ranges associated with a subject of the image, and determining, based at least in part on the first set of signal data, the correlation to untrustworthiness comprises: calculating, from the image, a depth associated with the subject of the image; comparing the calculated depth to the contemporaneous range data; and determining the correlation to untrustworthiness based on a mismatch of the calculated depth of the subject and a corresponding depth represented by the range data. For instance, the first sensor data includes an image, the first sensor comprising a camera, the second sensor data comprises range data representing one or more ranges associated a subject of the image, and determining, based at least in part on the first set of signal data, the correlation to untrustworthiness comprises: determining a boundary associated with the subject of the image; and determining whether the range data indicates a change in depth associated with the boundary of the subject of the image, wherein an absence of a change in range correlates to untrustworthiness. For instance, the first sensor data includes a first image of a document captured by a first camera, wherein the second sensor data includes a second image of a user's face captured by a second camera, and determining, based at least in part on the first set of signal data, the correlation to untrustworthiness comprises: comparing a facial image in the document to the user's face in the second image.

For instance, the first set of signal data includes one or more images of a document, and determining, based at least in part on the first set of signal data, the correlation to untrustworthiness comprises one or more of comparing a first image of the document to a second image of the document to determine a visual response of the document to one or more of a different light condition and a different position relative to a camera.

For instance, the first set of signal data includes one or more images of a document, and determining, based at least in part on the first set of signal data, the correlation to untrustworthiness comprises one or more of: determining a curvature of the document in a first image and determining whether the curvature is inconsistent with a rigidity of an authentic document; and determining an absence of an expected document defect in the first image and determining the absence of the expected document defect is inconsistent with an authentic document.

For instance, the first set of environmental data includes motion sensor data indicative of which hand is holding the user device when a first image is captured, the first sensor data includes the first image, the first image including a representation of a user's hand, and wherein determining the correlation to untrustworthiness includes determining whether the hand holding the user device is the same hand as the hand represented in the first image. For instance, the first set of environmental data includes motion sensor data, the first sensor data includes the first image, and wherein determining the correlation to untrustworthiness includes determining whether the user device was static when the first image was captured. For instance, the first set of environmental data includes biometric data, and wherein determining the correlation to untrustworthiness includes determining whether the biometric data indicates a stress response. For instance, the first set of environmental data includes one or more of a geo location, a direction, a timestamp, a temperature, network information, and camera information, wherein determining the correlation to untrustworthiness includes determining a change in one or more of the geo location, the direction, the timestamp, the temperature, network information, and the camera information during the user journey.

For instance, the features include determining a second position in the user journey; determining a second set of environmental signal data; and obtaining the second set of signal data, the second set of environmental signal data representing, at a second time, one or more of the environment of the user device and the user device in relation to the environment, wherein determining the correlation to untrustworthiness is based on the first set of signal data and the second set of signal data.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

The present disclosure is described in the context of example correlations, example signals, and example use cases; however, those skilled in the art should recognize that the signal correlator may be applied to other environments, signals, and use cases without departing from the disclosure herein.

Inputs, such as inputs of documentation, may be provided for any number of reasons or in association with any number of transactions in a user journey. For example, providing picture ID may be required to open a financial account to reduce the risk of fraud and/or to comply with laws (e.g., anti-money laundering or sanctions). In another example, a copy of recent bank statement or utility bill with a street address may be provided to prove a place of residence, which may be relevant for obtaining a library card, registering for school in a school district, registering to vote in a district, etc. In yet another example, an image of a check may be provided to deposit the check.

Increasingly, transactions are being performed remotely or electronically, e.g., online through web browsers or mobile applications. Obtaining inputs remotely or electronically presents challenges, which are not present when physically presented in person. For example, when a person physically presents the documentation in the physical world, the document may be manipulated in order to find, view, and extract information from the document and be compared against the person presenting the document. In a remote or electronic transaction, direct physical manipulation and viewing of the physical document is not feasible. Rather, image data (e.g., a photo or video) of the document may be obtained, attributes (or data) extracted from the image, and compared to reference documentation.

Technology has increasingly made it easier for nefarious users to generate falsified documents and user images. Accordingly, it is beneficial to identify and apply additional signals to determine whether the signals correlate to untrustworthiness, e.g., correlate to or indicate identity fraud, intent to deceive, physical or digital manipulation, inauthenticity, etc. The signal correlator 226 described herein may address, at least in part, one or more of the foregoing issues and/or provide, at least in part, one or more of the aforementioned benefits.

Figure 1:
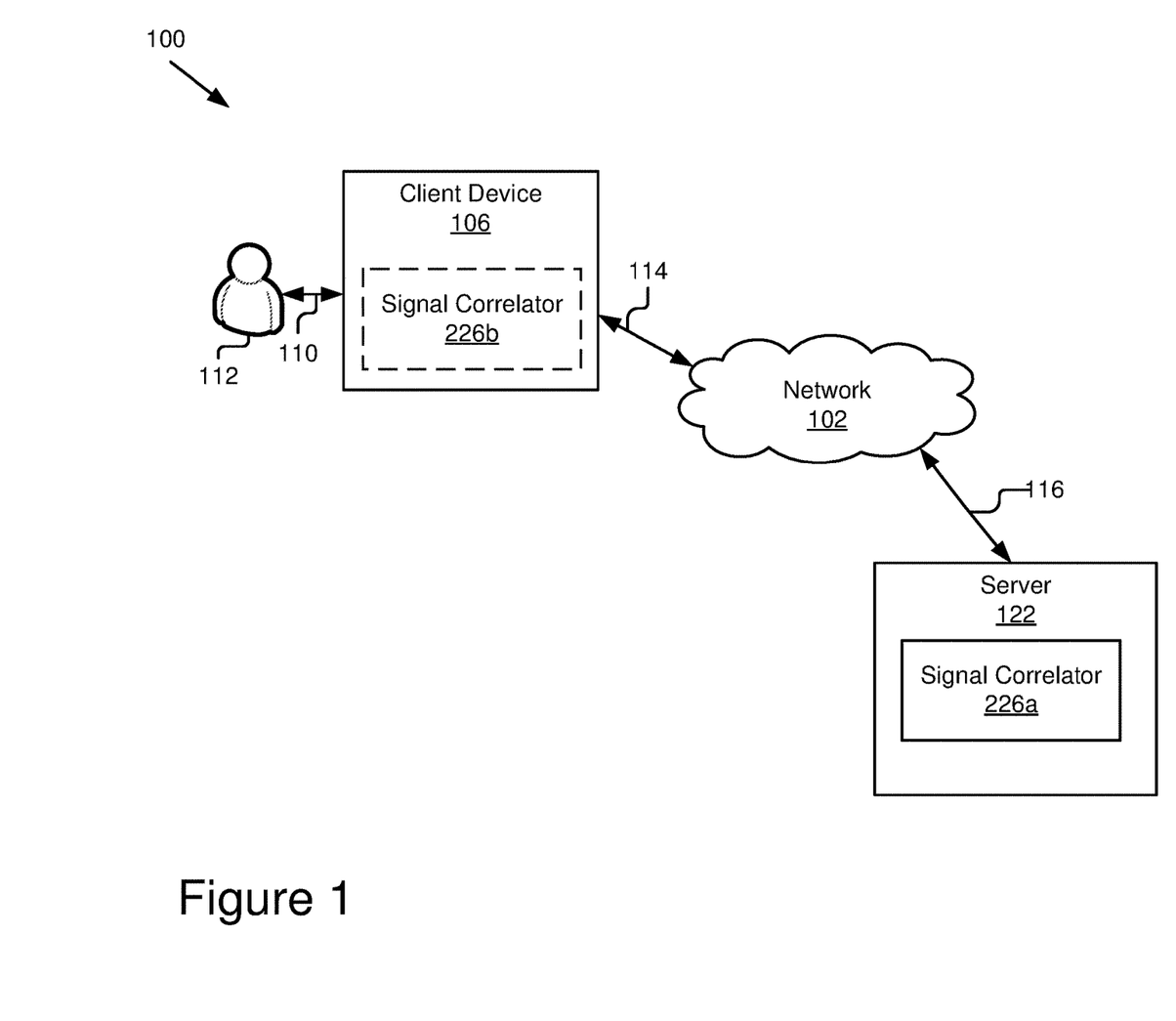
FIG. 1 is a block diagram of one example implementation of a system for correlation of signals in accordance with some implementations.

FIG. 1 is a block diagram of an example system 100 for correlation of signals in accordance with some implementations. As depicted, the system 100 includes a server 122 and a client device 106 coupled for electronic communication via a network 102.

The client device 106 is a computing device that includes a processor, a memory, and network communication capabilities (e.g., a communication unit). The client device 106 is coupled for electronic communication to the network 102 as illustrated by signal line 114. In some implementations, the client device 106 may send and receive data to and from other entities of the system 100 (e.g., a server 122). Examples of client devices 106 may include, but are not limited to, mobile phones (e.g., feature phones, smart phones, etc.), tablets, laptops, desktops, netbooks, portable media players, personal digital assistants, etc.

Although only a single client device 106 is shown in the example of FIG. 1, there may be any number of client devices 106 depending on the implementation. The system 100 depicted in FIG. 1 is provided by way of example and the system 100 and further systems contemplated by this present disclosure may include additional and/or fewer components, may combine components and/or divide one or more of the components into additional components, etc. For example, the system 100 may include any number of client devices 106, networks 102, or servers 122.

The network 102 may be a conventional type, wired and/or wireless, and may have numerous different configurations including a star configuration, token ring configuration, or other configurations. For example, the network 102 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), cellular (e.g., 4G or 5G), and/or other interconnected data paths across which multiple devices may communicate.

The server 122 is a computing device that includes a hardware and/or virtual server that includes a processor, a memory, and network communication capabilities (e.g., a communication unit. The server 122 may be communicatively coupled to the network 102, as indicated by signal line 116. In some implementations, the server 122 may send and receive data to and from other entities of the system 100 (e.g., one or more client devices 106).

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

For example, as depicted, the client device 106 may optionally (as indicated by the dashed lines) include an instance of the signal correlator 226b and the server 122 may include an instance of the signal correlator 226a. However, in some implementations, the components and functionality of the signal correlator 226 may be entirely client-side (i.e., at 226b), entirely server side (i.e., at 226a), or divide among the client device 106 and server 122 (i.e., divided across 226a and 226b). For example, as described below, some implementations may use machine learning (e.g., one or more algorithms to train one or more models), and the training and validation of the model(s) may be performed server-side at 226a and applied, during production, client side at 226b.

Figure 2:
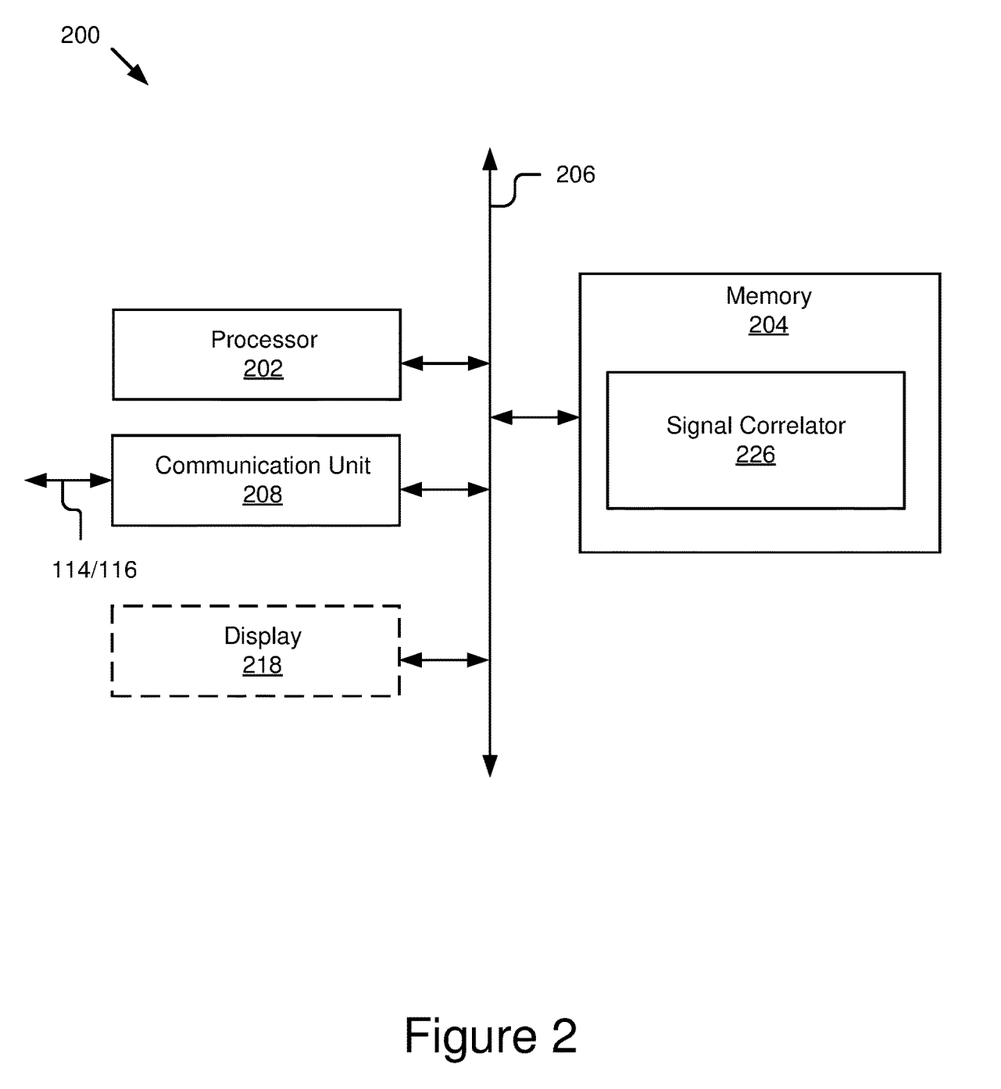
FIG. 2 is a block diagram of an example computing device in accordance with some implementations.

FIG. 2 is a block diagram of an example computing device 200 including an instance of the signal correlator 226. The signal correlator 226 which may refer to either instance 226a when the computing device 200 is a server 122, 226b where the computing device 200 is a client device 106, or a combination of 226a and 226b where the functionality is divided between 226b of the client device 106 and 226a of the server 122. In the illustrated example, the computing device 200 includes a processor 202, a memory 204, a communication unit 208, and a display 218.

In some implementations, the computing device 200 is a client device 106, the memory 204 stores the signal correlator 226b, and the communication unit 208 is communicatively coupled to the network 102 via signal line 114. In some implementations, the computing device 200 is a client device 106, which may occasionally be referred to herein as a user device, and the client device 106 includes at least one sensor, e.g., a camera. In another implementation, the computing device 200 is a server 122, the memory 204 stores the signal correlator 226a, and the communication unit 208 is communicatively coupled to the network 102 via signal line 116.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual and may include a single processing unit or a plurality of processing units and/or cores. In some implementations, the processor 202 may be capable of generating and providing electronic display signals to a display device, supporting the display of images, capturing and transmitting images, and performing complex tasks and determinations. In some implementations, the processor 202 may be coupled to the memory 204 via the bus 206 to access data and instructions therefrom and store data therein. The bus 206 may couple the processor 202 to the other components of the computing device 200 including, for example, the memory 204, the communication unit 208.

The memory 204 may store and provide access to data for the other components of the computing device 200. The memory 204 may be included in a single computing device or distributed among a plurality of computing devices. In some implementations, the memory 204 may store instructions and/or data that may be executed by the processor 202. The instructions and/or data may include code for performing the techniques described herein. For example, in one implementation, the memory 204 may store an instance of the signal correlator 226. The memory 204 is also capable of storing other instructions and data, including, for example, an operating system, hardware drivers, other software applications, databases, etc. The memory 204 may be coupled to the bus 206 for communication with the processor 202 and the other components of the computing device 200.

The memory 204 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 202. In some implementations, the memory 204 may include one or more of volatile memory and non-volatile memory. The memory 204 may be a single device or may include multiple types of devices and configurations.

The communication unit 208 is hardware for receiving and transmitting data by linking the processor 202 to the network 102 and other processing systems. The communication unit 208 receives data and transmits the data via the network 102. The communication unit 208 is coupled to the bus 206. In one implementation, the communication unit 208 may include a port for direct physical connection to the network 102 or to another communication channel. For example, the computing device 200 may be the server 122, and the communication unit 208 may include an RJ45 port or similar port for wired communication with the network 102. In another implementation, the communication unit 208 may include a wireless transceiver (not shown) for exchanging data with the network 102 or any other communication channel using one or more wireless communication methods, such as IEEE 802.11, IEEE 802.16, Bluetooth® or another suitable wireless communication method.

In yet another implementation, the communication unit 208 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another implementation, the communication unit 208 may include a wired port and a wireless transceiver. The communication unit 208 also provides other connections to the network 102 for distribution of files and/or media objects using standard network protocols such as TCP/IP, HTTP, HTTPS, and SMTP as will be understood to those skilled in the art.

The display 218 may include a liquid crystal display (LCD), light emitting diode (LED), touchscreen, or any other similarly equipped display device, screen, or monitor. The display 218 represents any device equipped to display electronic images and data as described herein.

It should be apparent to one skilled in the art that other processors, operating systems, inputs (e.g., keyboard, mouse, one or more sensors, etc.), outputs (e.g., a speaker, display, haptic motor, etc.), and physical configurations are possible and within the scope of the disclosure. Examples of sensors (not shown) include, but are not limited to, a microphone, a speaker, a camera, a thermal camera, a pointer sensor (e.g., a capacitive touchscreen or mouse), a gyroscope, an accelerometer, a range sensor (e.g., radio detection and ranging "radar" and/or light detection and ranging "LiDAR"), a galvanic sensor, thermocouple, heart rate monitor, breathing monitor, electroencephalogram (EEG), iris scanner, fingerprint reader, raster scanner, palm print reader, an inertial sensor, global positioning system (GPS) sensor, etc.

In some implementations, the signal correlator 226 provides the features and functionalities described below responsive to a request. For example, a request on behalf of an entity (not shown), such as a business or financial institution, to determine whether a user or transaction is legitimate (i.e., trustworthy) or potentially fraudulent (i.e., untrustworthy). As another example, the request may be an authentication request.

Figure 3:
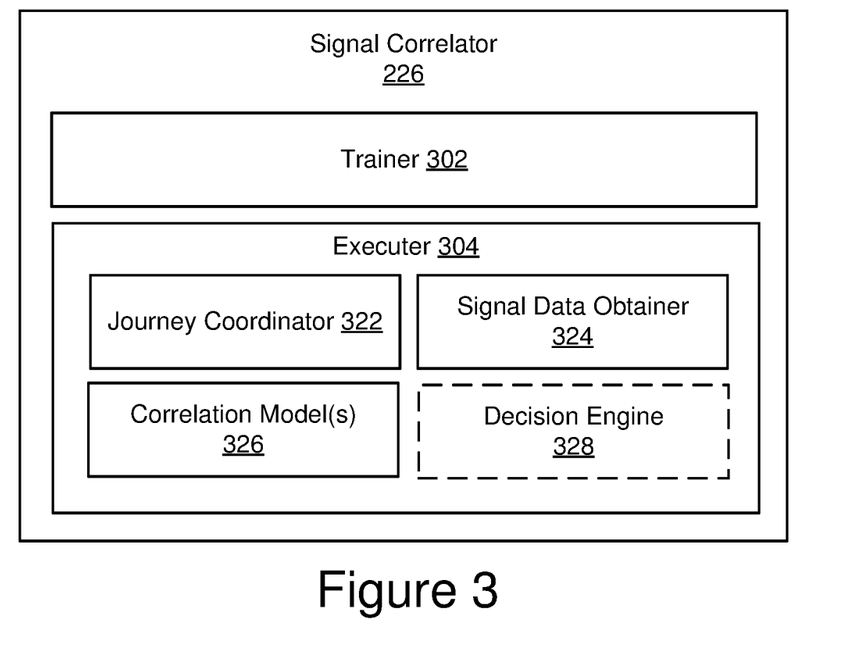
FIG. 3 is a block diagram of an example signal correlator in accordance with some implementations.

Referring now to FIG. 3, a block diagram of an example of signal correlator 226 is illustrated in accordance with one implementation. As illustrated in FIG. 3, the signal correlator 226 may include a trainer 302 and an executer 304. In the illustrated implementation, the executer 304 includes a journey coordinator 322, a signal data obtainer 324, correlation model(s) 326, and, optionally in some implementations, an decision engine 328. In some implementations, the components (e.g., 302 and 304) of the signal correlator are communicatively coupled to communicate information with one another and/or the subcomponents (e.g., 322-328) thereof.

The trainer 302 trains the one or more correlation models executed by the executer 304 to determine whether a correlation to untrustworthiness is present. For clarity and convenience, this disclosure provides numerous examples, of different sensors, signals, and correlation models. However, it should be recognized that these are merely examples and other examples exist as the variety of sensors, signals, correlations, models, etc. are so numerous as to defy a complete listing.

In some implementations, the trainer 302 trains, validates, and retrains at least one correlation model. As the sensors, signals, time of signal capture, correlation may vary based on the implementation and use case, so to do the one or more correlation models. The varieties of supervised, semi-supervised, and unsupervised machine learning algorithms that may be used, by the trainer 302 (i.e., trained, validated, retrained, and deployed for execution by the executer 304) are so numerous as to defy a complete list. Example algorithms include, but are not limited to, a decision tree; a gradient boosted tree; boosted stumps; a random forest; a support vector machine; a neural network; a recurrent neural network; convolutional neural network; long short-term memory; transformer; logistic regression (with regularization), linear regression (with regularization); stacking; a Markov model; Markov chain; support vector machines; and others.

Additionally, depending on the implementation, the various machine learning models trained, by the trainer 302, and deployed, by the executer 304, may or may not be based on a common machine learning algorithm or a common type (e.g., supervised, semi-supervised, or unsupervised) of machine learning algorithm. For example, as described below with reference to FIG. 4, multiple correlation models 402-418 are described; in some implementations, subsets of those correlation models may be based on different types of machine learning algorithms (e.g., supervised or unsupervised) and/or have different types of outputs (e.g., a continuous output from a regression, or a categorical output from a classification), etc. As another example, in some implementations, one or more of the correlation models 402-418 may be heuristic (i.e., based on one or more rules) or statistical determination and may not train a machine learning algorithm.

The executer 304 obtains signal data and deploys, or applies, the one or more correlation models to determine whether a correlation with untrustworthiness exists. In the illustrated implementation, the executer 304 includes a journey coordinator 322, a signal data obtainer 324, correlation model(s) 326, and, optionally in some implementations, a decision engine 328.

The journey coordinator 322 determines a user's position in a user journey associated with a request. The request and the journey may vary without departing from the present disclosure. For clarity and convenience, the description herein frequently refers to a user journey associated with a user remotely and electronically opening a new financial account (e.g., credit card account, credit line, bank account, etc.). In this example journey, the user is prompted to take a photograph of identifying documentation (e.g., a driver's license) and a selfie (e.g., for comparison to the driver's license). However, this is merely one example of a user journey and an associated request and other journeys and requests are within the scope of this disclosure.

In some implementations, the journey coordinator 322 determines a user's position in a user journey based on information received from the user device 106. For example, the journey coordinator 322 may infer that a first received image file in the example user journey is associated with the point where the user captures an image of the user's ID document. In some implementations, the journey coordinator 322 determines a user's position in a journey based on information sent to for presentation to the user 112 via the user device 106. For example, the journey coordinator 322 may infer that, when the prompt to the user to take a photo of his/her government ID, the use is at the point in the journey where the user captures an image of his/her ID.

Depending on the implementation, the signal(s) the journey coordinator 322 determines to capture, for use by the one or more correlation models, and when may be static or dynamic. In some implementations, the signal(s) the journey coordinator 322 determines to capture, for use by the one or more correlation models, are static. For example, in some implementations, the journey coordinator 322 determines a common set of signals to be captured at the same points in the user journey across multiple user journeys. For example, the journey coordinator 322 determines that images from a front facing camera and rear facing camera are to be captured simultaneously when the user takes a photo of his/her ID documentation in the user journey to open a new financial account, so those signals are static in timing (i.e., where in the user journey they are captured) and type (i.e., the type of source sensors and sensor data gathered). In some implementations, the signal(s) the journey coordinator 322 determines to capture, for use by the one or more correlation models, are dynamic. For example, in some implementations, the journey coordinator 322 may determine additional signals to capture for User B's account opening journey, which were not determined for capture in User A's account opening journey. In some implementations, the dynamism may be based on an outcome of a correlation model. For example, a first set of signals captured earlier during User B's journey correlated to untrustworthiness, so the journey coordinator 322 determines to capture a second set of signals, e.g., which, when used by the one or more correlation models, may strengthen or weaken that initial correlation to untrustworthiness.

The signal data obtainer 324 obtains signal data. In some implementations, the signal data obtainer 324 obtains sensor data based on the position in the journey determined by the journey coordinator 322. For example, the signal data obtainer 324 is communicatively couple to receive the position from the journey coordinator 322 or retrieve the position, stored by the journey coordinator 322, from memory 204 or other data source.

The signals obtained, and subsequently used by a model, may vary based on the implementation and use case. For clarity and convenience, a number of signals are described by way of example herein. In some implementations, a signal may be associated with, or represented by, sensor data, such as the data described above with reference to FIG. 2 and sensors or described below with reference to FIG. 4.

In some implementations, a signal represents the environment of the user device or the user device in relation to that environment. Examples of signals that represent an environment of the user device may include, but are not limited to, signals describing the device's physical surroundings or their state, signals describing the user of the device, signals describing subject matter associated with a user journey within the environment (e.g., describing the user or an ID document), etc. Examples of signals describing a user devices relation to that environment include, but are not limited to, a physical or network location, physical position, orientation, velocity, altitude, distance to objects, a state of the device, etc.

In some implementations, the signal data obtainer 324 actively obtains one or more signals. For example, the signal data obtainer 324 actively induces production of a signal. For example, in some implementations, the signal data obtainer 324 may prompt the user to take a photo of the ID document using the rear-facing camera or a selfie with the front-facing camera and provide a preview to induce the user to create an image signal (i.e., the image of the ID and the selfie). As another example, in some implementations, the signal data obtainer 324 may induce the user to manipulate the document and/or the camera (e.g., to be used to determine whether the document has holographic ink or reflection consistent with that expected off a plastic ID card). As another example, in some implementations, the signal data obtainer 324 may actively illuminate the surroundings (e.g., with one or more flashes to determine if the user's face in the selfie is a live person or not) or emit a high frequency tone (e.g., to be used to determine the acoustic qualities of the environment).

In some implementations, the signal data obtainer 324 passively obtains one or more of the signals obtained. For example, the signal data obtainer passively records a temperature using a user device's sensor. It should be recognized that the preceding are merely examples and that other examples of signals which may be captured by the signal data obtainer 324 and used by the trainer 302 to train the correlation model(s) 326 and/or used by the correlation model(s) 326 upon deployment may vary, and other examples are described herein.

The signal data obtainer 324 is communicatively coupled to the client device 106 (i.e., a user device 106) to receive signal data, such as signal data captured by one or more sensors or from an application (e.g., banking app., browser, OS, etc.) running thereon. The 324 communicatively coupled to correlation model(s) 326 to provide signal data as an input to the one or more correlation models 326.

The correlation model(s) 326 receives signal data and executes one or more correlation models to determine whether the signal data is correlated to, or indicative of, untrustworthiness. As described above, with reference to the trainer 302, correlation model(s) 326 may vary. For example, the correlation models 326 may vary by one or more of type, algorithm, and signals used depending on the implementation and use case. As described above with reference to the signal data obtainer 324, the signals and/or associated sensor data may vary depending on the implementation and use case. While the variations in model, signals, and correlation to untrustworthiness may vary and the variations defy a complete listing, examples are described herein. For example, a number of signals, models, and correlations indicative of untrustworthiness are described here, e.g., with reference to FIG. 4, below.

Figure 4:
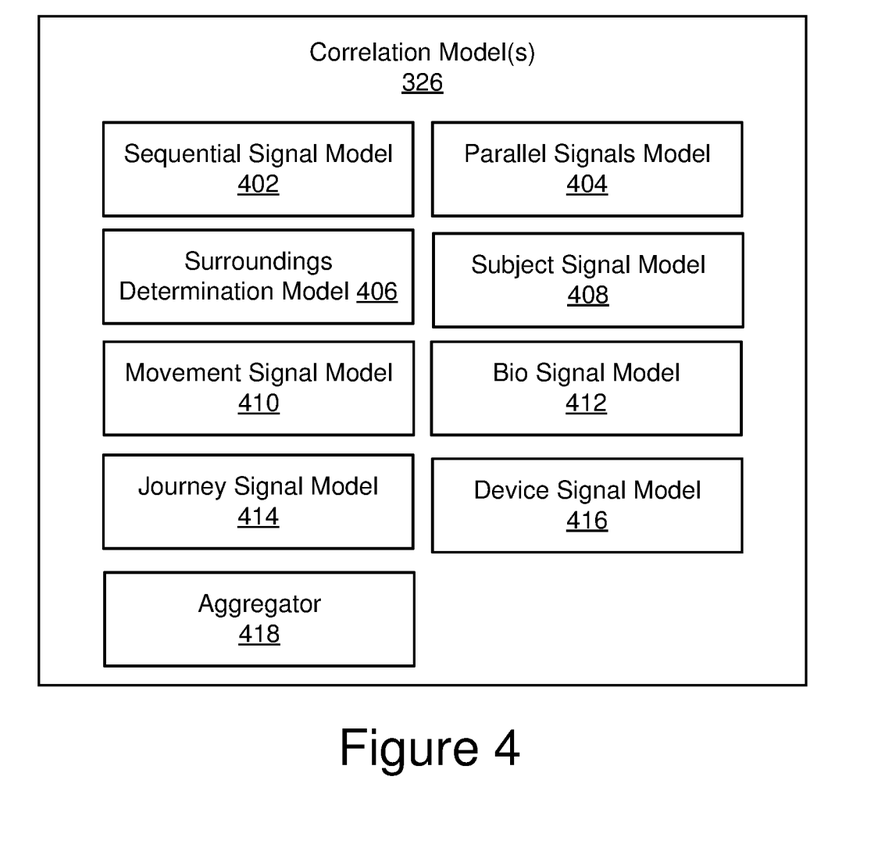
FIG. 4 is an illustration of example correlation models in accordance with some implementations.

Referring now to FIG. 4, examples of various potential correlation models 326 are illustrated in accordance with some implementations. The illustrated correlation models 326 includes a sequential signal modeler 402, the parallel signal modeler 404, the surroundings determination model 406, the subject signal model 408, the movement signal model 410, the biometric (bio) signal model 412, the journey signal model 414, the device signal model 416, and the aggregator 418. However, more, fewer, or different models may be present depending on the implementation.

The various models 402-416 within the correlation of models 326 have been named and provided for clarity and convenience. For example, the sequential and parallel models, 402 and 404, are describe relative timing of signals and/or associated signal data. As another example, the surroundings determination 406, subject signal 408, movement signal 410, bio signal 412, journey signal 414, and device signal 416 models are named and discussed to provide examples of what the signals and/or associated signal data may represent. However, it should be recognized that this is not an exhaustive list of the signals and models that may be used, and that other signals and models are within the scope of this description. It should further be recognized that the models of FIG. 4 are not necessarily mutually exclusive. For example, a surroundings determination model 406 may rely on one or more sequentially captured signals (i.e., is also a sequential signal model 402), one or more signals captured in parallel (i.e., is also a parallel signal model 404), or a combination thereof (i.e., is a 402 and 404 hybrid model), depending on the implementation. As another example, a signal (e.g., gyroscopic and/or accelerometer sensor data) may be used as a movement signal by the movement signal model 410, as a biometric signal by the bio signal model 412, or both, depending on the implementation.

The sequential signal model 402 uses two or more signals captured sequentially to determine a correlation with untrustworthiness. For example, a first set of one or more signals is captured at a first point in the user journey and a second set of one or more signals is captured at a second point in the user journey. The sequential signals and the sequential signal model 402 may vary depending on the implementation and use case. In some implementations, the sequential signal model 402 determines whether a change in a signal (e.g., a change in the sensor data from the same sensor) over time correlates to untrustworthiness.

The parallel signal model 404 uses two or more signals captured contemporaneously to determine a correlation with untrustworthiness. For example, a first set of one or more signals is captured using a first sensor (e.g., a rear-facing camera) simultaneously with a second set of one or more signals (e.g., a GPS position, audio, a timestamp, an image taken with the front-facing camera, etc.). The parallel, or contemporaneous, signals and the model may vary depending on the implementation and use case. In some implementations, the parallel signal model 404 determines whether contemporaneous signals are inconsistent to one another and, therefore, may correlate to untrustworthiness.

The surroundings determiner model 406 correlates one or more environment, or surroundings, signals to untrustworthiness. In some implementations, the surroundings signal model 408 receives sensor data describing the user's environment. Examples of environment signal data may include, but is not limited to image sensor data (e.g., RGB or thermal images from a camera sensor), range data (e.g., from a LiDAR or radar sensor), audio data (e.g., received by a microphone sensor), network signal data (e.g., describing the mobile, Wi-Fi, Bluetooth network, signal strength, etc.), environmental sensors (e.g., altimeter, barometer, thermometer, hygrometer, etc.), clock, positional sensor (e.g., GPS, compass), etc.

The surroundings determination model 406 may vary based on the environment and/or sensor data. For example, in some implementations, the surroundings determination model 406 compares a first set of images that was captured at a different point in the journey (e.g., prior to the capture of the selfie and/or ID) with one or more of the selfie and ID to determine whether the ambient light conditions are within an expected range (e.g., when the user device has not changed location). As another example, in some implementations, when the user photographs the ID with the rear-facing camera an image is also taken with the front-facing camera without the user knowing (e.g., the device's display only displays what's in frame of the rear-facing camera as the user lines up the photo of the ID), and the surroundings determination model 406 compares the face captured by the forward-facing camera contemporaneously when an image of the ID is captured with the rear-facing camera to one or more of the face in the ID document and the face in the selfie image, and determine that a mismatch correlates to untrustworthiness. As another example, in some implementations, when the user is taking a photo (e.g., of the ID or selfie) the image(s) taken have a wider field of view than is represented or presented to the user (e.g., the field of view displayed to the user, as a preview, is artificially narrowed and/or a photo is also taken with the device's wide angle camera), the surroundings determination model 406 identifies suspicious objects in the peripheral image data (i.e., the portion of the image out of frame) for suspicious objects. In some implementations, the surroundings determination model 406 may apply object detection to determine whether objects such as masks or other IDs are present in the surroundings, e.g., in the peripheral image data and/or data captured by the front-facing camera when the user is prompted to take an image with the rear-facing camera).

As another example, in some implementations, in some implementations, the surroundings determination model 406 classifies audio obtained at the time of image capture or throughout the user's journey. In some implementations, the classification may be to detect whether the audio portion associated with a video for selfie capture correlates with the audio in the video taken during ID capture, e.g., when the sensor data indicates the device has not moved or to determine if the change in the ambient noise is consistent with the movement detected (e.g., drone of road noise and geo location information indicating likely traveling by car based on speed and direction of travel). In some implementations, the classification may be to detect words indicative of fraudulent attempts or language mismatches between language spoken and country of origin (e.g., of the device, the SIM, the user's ID document, or a combination thereof).

The subject signal model 408 correlates subject signals to untrustworthiness. In some implementations, the subject signal model 408 receives sensor data describing a subject as one or more subject signals. In the example in which a purported selfie image of the user opening the new account and an image of that user's purported ID, the purported user and the purported ID are the subjects, respectively. Examples of subject signal data may include, but is not limited to image data (e.g., RGB or thermal images from a camera sensor), range data (e.g., from a LiDAR or radar sensor), audio data (e.g., received by a microphone sensor), etc.

The subject signal model 408 may vary based on the subject and/or sensor data. For example, in some implementations, the subject signal model 408 detects an anomalous curvature in the subject. For example, in some implementations, the subject signal model 408 applies a classifier that determines that ID pictured is associated with a rigid plastic substrate (e.g., a Utah Driver's License) and that the ID pictured has a detectable curvature (e.g., by analyzing the range data and/or the image of the ID) which is inconsistent with the expectation of a flat, rigid ID, and may indicate that the imaged ID is a printed on a less rigid medium (e.g., paper) and, therefore, untrustworthy.

As another example, in some implementations, the subject signal model 408 may determine from image data where features of interest are present (e.g., an edge of the ID, an edge of a user's face, the tip of the user's nose or other key point, etc.) and determine, from range senor data (e.g., LiDAR), whether a change in range (calculated form the range sensor data) consistent with the features of interest is present. It should be recognized that such models may detect when a selfie or document image are taken from, e.g., an image on a computer screen or printed onto paper and photographed and are, therefore, untrustworthy.

As another example, in some implementations, the subject signal model 408 may determine from image data whether an expected defect is present. For example, some identification documents have portions that fold out, and the subject signal model 408 may determine that the pictured document belongs to a class of document with an expected defect (e.g., a fold line) and determine whether that defect is present. As another example, in some implementations, the subject signal model 408 may determine from image data whether an unexpected defect is present. For example, the subject signal model 408 detects signs of delamination on a photo ID, which may indicate the lamination had been peeled back at one point.

As another example, in some implementations, the subject signal model 408 may analyze a series of sensor data representing the subject for the presence or absence of an expected response. For example, in some implementations, the subject signal model 408 analyzes a video or series of images of the ID document to determine whether holographic ink is present or whether, when subjected to active illumination, the ID responds as expected (e.g., the reflectivity of the captured image is consistent with the reflectivity and sheen of that document class), or the user's face during selfie capture responds to an active illumination of the user (e.g., expected eye dilation, blink, flinch, etc.).

The movement signal model 410 receives one or more signals representing movement. Examples of signals representing movement may include, but are not limited to, one or more of sensor data (e.g., from a gyroscope or accelerometer in the user's device 106), changes in geo location data (e.g., in the GPS coordinates), network location data (e.g., based on differences in mobile network, Wi-Fi, Bluetooth, or other wireless network connectivity), etc.

The movement signal model 410 may vary based on the one or more biometric signals. For example, in some implementations, the movement signal model 410 determines whether a presence of movement consistent with a user holding the device is detected during image capture and determine an absence of movement (e.g., jitter as represented in the accelerometer sensor signal data) to be indicative of untrustworthiness. For example, the lack of jitter during image capture may be indicative of the device is sitting on a table and the image is being injected rather than being taken live. As another example, the movement signal model 410 determines whether the user is walking or in a vehicle (e.g., based on the accelerometer, geo location signal data, and/or audio), which could indicate that a change in the user's surroundings between points in the user's journey may be less, or not, indicative of untrustworthiness.

The biometric signal model 412 correlates one or more biometric signals to untrustworthiness. The one or more biometric signals used by the biometric signal model may vary based on the implementation and use case. Examples of biometric signals may include, but are not limited to, biometric information within a passport, biometric information from a wearable sensor (e.g., a heart rate, change in heart rate, respiration rate, change in respiration rate, galvanic skin response, etc.), biometric information derived from sensors on a user device such as a mobile phone (e.g., user gait, user gestures, which may indicate right or left handedness, images of the user's fingertips/prints or profile of user's knuckle wrinkles, user's grip style when holding the ID for capturing image(s) of the ID, etc.).

The biometric signal model 412 may vary based on the one or more biometric signals. For example, in some implementations, the biometric signal model 412 detects a stress response indicative of untrustworthiness based on the one or more biometric signals. Examples of a stress response may include one or more of an increase in heart rate, respiration, galvanic skin conductance (i.e., sweating), etc. that may indicate the user is nervous (e.g., about whether a fraud attempt will be successful) a point in the journey (e.g., when taking a photo of the ID or while waiting for an approval of the new account request).

As another example, in some implementations, the biometric signal model 412 identifies inconsistent biometrics indicative of, or correlated to, untrustworthiness. Examples of inconsistent biometrics may include, but are not limited to, an inconsistency between biometric information extracted during the journey and/or from a trusted reference source. For example, in some implementations, the biometric signal model 412 may include a machine learning model that determines, from the user's selfie image, one or more of eye color, gender, skin tone, age, key points (e.g., for facial recognition) and compares that to corresponding biometrics extracted from the image on the user's ID (e.g., passport or driver's license photo) or to a trusted reference source such as biometric information extracted via NFC from the passport, when the ID is a passport, or from a department of motor vehicles or office of vital statistics database. As another example, the biometric signal model 412 may determine a user gesture indicative of handedness (i.e., right or left handedness) from one or more of finger swipes on a touch screen, accelerometer signal data, or gyroscope signals, determine a handedness present in the image (e.g., right hand holding the ID in the ID photo or right arm extended during the selfie) and determines whether there's an inconsistency (e.g., gesture signals indicate phone is in the right hand, but the image shows the right hand holding the ID or the left arm outstretched in selfie or angle is consistent with the camera being held by the left hand).

The journey signal model 414 uses one or more journey signals that describe the user's journey to determine those signals correlate to, i.e., indicate, untrustworthiness. For example, the journey signal model 414 uses one or more journey signals including one or more of a total time of journey (e.g., time elapsed from initialization of the new account journey to final submission, where a greater time may be indicative of untrustworthiness); time between points in the journey (e.g., time between prompt to take a selfie and actual capture of the selfie, where a greater time may be more indicative of untrustworthiness as the user is staging the scene and/or too short of a time may be indicative of an automated or scripted attempt); a number of failed attempts during a journey, where a greater number of failures may be indicative of untrustworthiness; duration of taps, duration, location, and direction of swipes (e.g., which could indicate computer automation if too short or too perfectly centered and linear); etc.

The device signal model 416 correlates one or more device signals to untrustworthiness. In some implementations, the device signal describes the user device 106. The one or more device signals may vary based on the implementation and use case. Examples of device signals include, but are not limited to, whether the user device is jail broken, battery information (e.g., level of charge, capacity, etc.), device age, whether the user device is in development mode, whether the use device has USB debugging enabled, country information associated with the SIM, device location, virtual camera usage, network information (e.g., Wi-Fi network name, connectivity, signal strength, network speed, etc.), camera information (e.g., silicon noise signature, exposure time, gate speed, etc.), user contact list information (e.g., number of contacts, certain names, etc.), MAC address, IP address, electronic serial number, etc.

The device signal model 416 may vary based on the one or more device signals. For example, in some implementations, the device signal model 416 may correlate a jailbroken device with a higher probability of untrustworthiness. As another example, in some implementations, the device signal model 416 may correlate a mismatch between a device's geo location and the country associated with the device's SIM card to untrustworthiness. As another example, in some implementations, the device signal model 416 may correlate the state of the device being in development mode with a higher probability of untrustworthiness. As another example, in some implementations, the device signal model 416 may correlate the use of a virtual camera strongly with untrustworthiness, as it may indicate that the user is injecting an image or video stream, rather than taking a live image of the ID and user. As another example, in some implementations, the device signal model 416 may correlate a mismatch in a camera's signature (e.g., silicon noise, camera settings, such as gate, color palette, metadata, etc.) between two images in a user's journey (e.g., that of the ID and selfie) to untrustworthiness. As another example, in some implementations, the device signal model 416 may correlate changes in network speed or the Wi-Fi network used to be untrustworthiness. As another example, in some implementations, the device signal model 416 may correlate contact list information (e.g., lack of a contact list or small contact list) with untrustworthiness, as that may be indicative of the device not being a user's actively used device, but a temporary, or "burner," phone for making fraudulent attempts.

The aggregator 418 aggregates results from multiple correlation models. In some implementations, the aggregator 418 receives the results of two or more of the sequential signal model 402, the parallel signals model 404, the surroundings determination model 406, the subject signal model 408, the movement signal model 410, the biometric signal model 412, the journey signal model 414, and the device signal model 416. In some implementations, the results of the two or more models may be weighted. In some implementations, those weights may be derived by training (e.g., by the trainer 302) using a machine learning algorithm and results of the two or more correlation models.

In some implementations, the results from the two or more correlation models may be of a different type (e.g., one result may be a discrete class, such as "untrustworthy" and another result may be a continuous value, such as "0.33" indicating a 33% chance the image is untrustworthy). In some implementations, the aggregator 418 may aggregate disparate types of results. For example, in some implementations, the aggregator 418 may create a plurality of bins to transform ranges of continuous values into a discrete class associated with each bin. As another example, in some implementations, the aggregator 418 may assign a continuous value (e.g., 0.75) to a result that's a class (e.g., "likely untrustworthy").

It should be recognized that the two or more correlation models may, at times, disagree. For example, the biometric signal model(s) 412 may indicate trustworthiness while the subject signal model(s) 408 indicate untrustworthiness. The aggregator 418 may, therefore, determine an overall (un) trustworthiness, e.g., by assigning more weight to results of more definitive models and less weight to models that may individually have more noise and be less definitive when considered individually.

The decision engine 328 determines and/or initiates an action based on the correlation of signals. Examples of actions include, but are not limited to, one or more of present the correlation, determine a trust score, accept or reject a sub-step of the request (e.g., reject the submitted selfie or ID photo), accept or reject the associated request, label the associated request as trustworthy or untrustworthy, contact authorities, escalate for investigation, initiate a case (e.g., of identity fraud), escalate for additional verification checks, etc. In some implementations, the decision engine 328 uses machine learning or artificial intelligence. For example, the decision engine 328 may apply machine learning, or artificial intelligence, to determine one or more of the parameters/ criteria and/or values used to take an action and/or what action to take when (e.g., based on which parameters/criteria and/or values).

Example Methods

Figure 5:
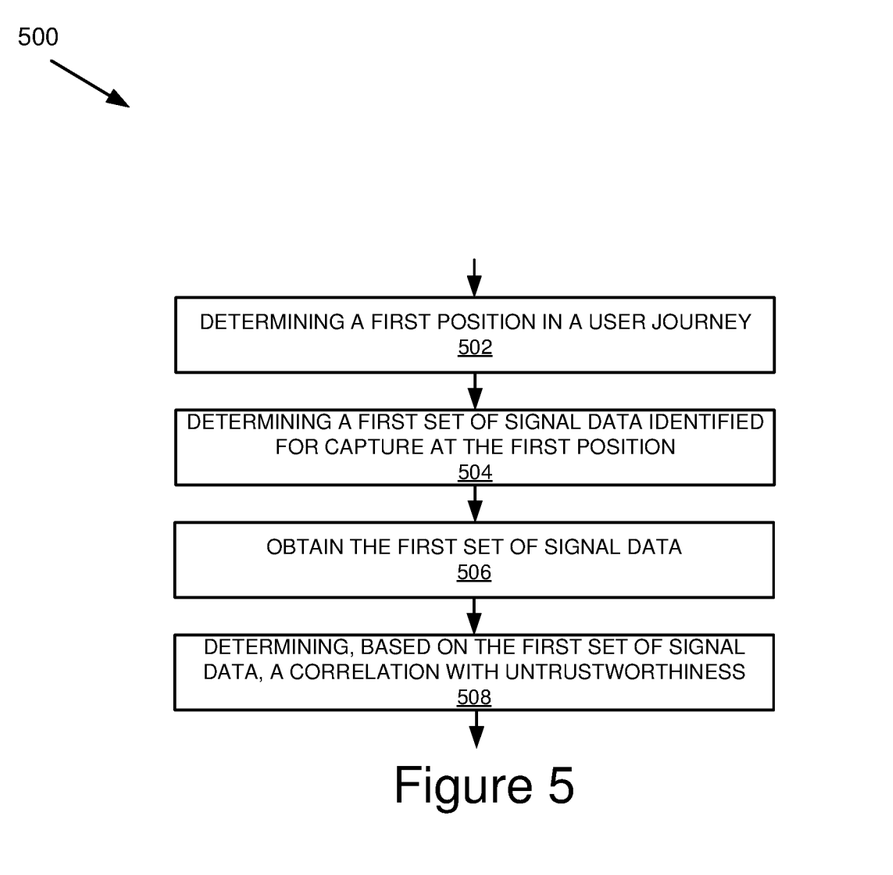
FIG. 5 is a flowchart of an example method for correlation of signals in accordance with some implementations.

FIG. 5 is a flowchart of an example method that may, in accordance with some implementations, be performed by the systems described above with reference to FIGS. 1-4. The methods 500 of FIG. 5 is provided for illustrative purposes, and many variations exist and are within the scope of the disclosure herein.

FIG. 5 is a flowchart of an example method 500 for correlation of signals in accordance with some implementations. At block 502, the journey coordinator 322 determines a first position in a user journey. At block 504, the signal data obtainer 324 determines a first set of signal data identified for capture at the first position in the user journey. For example, the signal data obtainer 324 obtains the first set of environmental signal data including a representation, at a first time, of one or more of an environment of a user device and the user device in relation to the environment. At block 506, the signal data obtainer 324 obtains the first set of signal data, e.g., including first sensor data obtained from a first sensor at the user device. At block 508, the correlation model(s) 326 determine, based at least in part on the first set of signal, a correlation to untrustworthiness.

Other Considerations

It should be understood that the above-described examples are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" or "some implementations" means that a particular feature, structure, or characteristic described in connection with the implementation is included in at least one implementation. The appearances of the phrase "in some implementations" in various places in the specification are not necessarily all referring to the same implementations.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer-readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As should be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies, engines, and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
    determining, using one or more processors, a first position in a user journey;
    determining, using the one or more processors, a first set of signal data identified for capture at the first position in the user journey, the first set of environmental signal data including a representation, at a first time, of one or more of an environment of a user device and the user device in relation to the environment;
    obtaining, using the one or more processors, the first set of signal data, the first set of signal data including first sensor data obtained from a first sensor at the user device; and
    determining, using the one or more processors, based at least in part on the first set of signal data including the first sensor data, a correlation to untrustworthiness.

2. The method of claim 1, the method further comprising:
    based on determining that the first set of signal data correlates to untrustworthiness, taking an action, wherein the action includes one or more of rejecting a user request, subjecting the user request to an additional authentication, contacting an authority, initiating a case, and labeling the user request as untrustworthy.

3. The method of claim 1, wherein the first sensor data includes a first image captured by a first camera, and determining the correlation to untrustworthiness comprises one or more of:
    determining peripheral image data, the peripheral image data representing a portion of the first image that was not presented to a user at a time of capture of the first image, wherein the first camera has a wider field of view than is presented to the user at the time of capture; and identifying one or more suspicious objects in the peripheral image data, wherein a suspicious object includes one or more of a mask and another version of a document.

4. The method of claim 1, wherein the first set of signal data includes the first sensor data obtained from the first sensor and second sensor data obtained by a second sensor, and wherein the first sensor data and second sensor data are obtained contemporaneously from two sensors at the user device.

5. The method of claim 4, wherein the first sensor data includes an image, the first sensor comprising a camera, the second sensor data comprises range data representing one or more ranges associated with a subject of the image, and determining, based at least in part on the first set of signal data, the correlation to untrustworthiness comprises:
   calculating, from the image, a depth associated with the subject of the image;
   comparing the calculated depth to the contemporaneous range data; and
   determining the correlation to untrustworthiness based on a mismatch of the calculated depth of the subject and a corresponding depth represented by the range data.

6. The method of claim 4, wherein the first sensor data includes an image, the first sensor comprising a camera, the second sensor data comprises range data representing one or more ranges associated a subject of the image, and determining, based at least in part on the first set of signal data, the correlation to untrustworthiness comprises:
   determining a boundary associated with the subject of the image; and
   determining whether the range data indicates a change in depth associated with the boundary of the subject of the image, wherein an absence of a change in range correlates to untrustworthiness.

7. The method of claim 4, wherein the first sensor data includes a first image of a document captured by a first camera, wherein the second sensor data includes a second image of a user's face captured by a second camera, and determining, based at least in part on the first set of signal data, the correlation to untrustworthiness comprises:
   comparing a facial image in the document to the user's face in the second image.

8. The method of claim 1, wherein the first set of signal data includes one or more images of a document, and determining, based at least in part on the first set of signal data, the correlation to untrustworthiness comprises one or more of comparing a first image of the document to a second image of the document to determine a visual response of the document to one or more of a different light condition and a different position relative to a camera.

9. The method of claim 1, wherein the first set of signal data includes one or more images of a document, and determining, based at least in part on the first set of signal data, the correlation to untrustworthiness comprises one or more of:
   determining a curvature of the document in a first image and determining whether the curvature is inconsistent with a rigidity of an authentic document; and
   determining an absence of an expected document defect in the first image and determining the absence of the expected document defect is inconsistent with an authentic document.

10. The method of claim 1, wherein one or more of:
   the first set of environmental data includes motion sensor data indicative of which hand is holding the user device when a first image is captured, the first sensor data includes the first image, the first image including a representation of a user's hand, and wherein determining the correlation to untrustworthiness includes determining whether the hand holding the user device is the same hand as the hand represented in the first image;
   the first set of environmental data includes motion sensor data, the first sensor data includes the first image, and wherein determining the correlation to untrustworthiness includes determining whether the user device was static when the first image was captured;
   the first set of environmental data includes biometric data, and wherein determining the correlation to untrustworthiness includes determining whether the biometric data indicates a stress response; and
   the first set of environmental data includes one or more of a geo location, a direction, a timestamp, a temperature, network information, and camera information, wherein determining the correlation to untrustworthiness includes determining a change in one or more of the geo location, the direction, the timestamp, the temperature, network information, and the camera information during the user journey.

11. The method of claim 1 further including:
   determining a second position in the user journey;
   determining a second set of environmental signal data; and
   obtaining the second set of signal data, the second set of environmental signal data representing, at a second time, one or more of the environment of the user device and the user device in relation to the environment,
   wherein determining the correlation to untrustworthiness is based on the first set of signal data and the second set of signal data.

12. A system comprising:
   one or more processors; and
   a memory, the memory storing instructions that, when executed by the processor, cause the system to:
      determine a first position in a user journey;
      determine a first set of signal data identified for capture at the first position in the user journey, the first set of environmental signal data including a representation, at a first time, of one or more of an environment of a user device and the user device in relation to the environment;
      obtain the first set of signal data, the first set of signal data including first sensor data obtained from a first sensor at the user device; and
      determine based at least in part on the first set of signal data including the first sensor data, a correlation to untrustworthiness.

13. The system of claim 12, wherein the instructions further cause the system to:
   based on determining that the first set of signal data correlates to untrustworthiness, taking an action, wherein the action includes one or more of rejecting a user request, subjecting the user request to an additional authentication, contacting an authority, initiating a case, and labeling the user request as untrustworthy.

14. The system of claim 12, wherein the first sensor data includes a first image captured by a first camera, and determining the correlation to untrustworthiness comprises one or more of:
   determining peripheral image data, the peripheral image data representing a portion of the first image that was not presented to a user at a time of capture of the first image, wherein the first camera has a wider field of view than is presented to the user at the time of capture; and identifying one or more suspicious objects in the peripheral image data, wherein a suspicious object includes one or more of a mask and another version of a document.

15. The system of claim 12, wherein the first set of signal data includes the first sensor data obtained from the first sensor and second sensor data obtained by a second sensor, and wherein the first sensor data and second sensor data are obtained contemporaneously from two sensors at the user device.

16. The system of claim 15, wherein the first sensor data includes an image, the first sensor comprising a camera, the second sensor data comprises range data representing one or more ranges associated with a subject of the image, and determining, based at least in part on the first set of signal data, the correlation to untrustworthiness comprises:

calculating, from the image, a depth associated with the subject of the image;
comparing the calculated depth to the contemporaneous range data; and
determining the correlation to untrustworthiness based on a mismatch of the calculated depth of the subject and a corresponding depth represented by the range data.

17. The system of claim 15, wherein the first sensor data includes an image, the first sensor comprising a camera, the second sensor data comprises range data representing one or more ranges associated a subject of the image, and determining, based at least in part on the first set of signal data, the correlation to untrustworthiness comprises:

determining a boundary associated with the subject of the image; and
determining whether the range data indicates a change in depth associated with the boundary of the subject of the image, wherein an absence of a change in range correlates to untrustworthiness.

18. The system of claim 15, wherein the first sensor data includes a first image of a document captured by a first camera, wherein the second sensor data includes a second image of a user's face captured by a second camera, and determining, based at least in part on the first set of signal data, the correlation to untrustworthiness comprises:

comparing a facial image in the document to the user's face in the second image.

19. The system of claim 12, wherein the first set of signal data includes one or more images of a document, and determining, based at least in part on the first set of signal data, the correlation to untrustworthiness comprises one or more of comparing a first image of the document to a second image of the document to determine a visual response of the document to one or more of a different light condition and a different position relative to a camera.

20. The system of claim 12, wherein the first set of signal data includes one or more images of a document, and determining, based at least in part on the first set of signal data, the correlation to untrustworthiness comprises one or more of:

determining a curvature of the document in a first image and determining whether the curvature is inconsistent with a rigidity of an authentic document; and
determining an absence of an expected document defect in the first image and determining the absence of the expected document defect is inconsistent with an authentic document.

21. The system of claim 12, wherein one or more of:

the first set of environmental data includes motion sensor data indicative of which hand is holding the user device when a first image is captured, the first sensor data includes the first image, the first image including a representation of a user's hand, and wherein determining the correlation to untrustworthiness includes determining whether the hand holding the user device is the same hand as the hand represented in the first image;
the first set of environmental data includes motion sensor data, the first sensor data includes the first image, and wherein determining the correlation to untrustworthiness includes determining whether the user device was static when the first image was captured;
the first set of environmental data includes biometric data, and wherein determining the correlation to untrustworthiness includes determining whether the biometric data indicates a stress response; and
the first set of environmental data includes one or more of a geo location, a direction, a timestamp, a temperature, network information, and camera information, wherein determining the correlation to untrustworthiness includes determining a change in one or more of the geo location, the direction, the timestamp, the temperature, network information, and the camera information during the user journey.

22. The system of claim 12, wherein the instructions further cause the system to:

determine a second position in the user journey;
determine a second set of environmental signal data; and
obtain the second set of signal data, the second set of environmental signal data representing, at a second time, one or more of the environment of the user device and the user device in relation to the environment,
wherein determining the correlation to untrustworthiness is based on the first set of signal data and the second set of signal data.

\* \* \* \* \*